W. A. UNDERHILL & C. C. AVERY.
STEERING MECHANISM FOR WAGON TRAINS.
APPLICATION FILED DEC. 8, 1913.

1,241,786.

Patented Oct. 2, 1917.

WITNESSES:

INVENTORS.

ATTORNEYS.

UNITED STATES PATENT OFFICE.

WALTER A. UNDERHILL AND COURTNEY C. AVERY, OF AUBURN, NEW YORK, ASSIGNORS TO THE EAGLE WAGON WORKS, OF AUBURN, NEW YORK, A CORPORATION OF NEW YORK.

STEERING MECHANISM FOR WAGON-TRAINS.

1,241,786.   Specification of Letters Patent.   Patented Oct. 2, 1917.

Application filed December 8, 1913. Serial No. 805,341.

*To all whom it may concern:*

Be it known that we, WALTER A. UNDERHILL and COURTNEY C. AVERY, citizens of the United States, and residents of Auburn, in the county of Cayuga and State of New York, have invented a certain new and useful Steering Mechanism for Wagon-Trains, of which the following is a specification.

This invention has for its object the production of a mechanism for steering a train of carts from the front end of the train whereby the carts can be pushed in front of a traction engine or any other actuating means, which steering mechanism is particularly simple in construction, economical in manufacture, readily attached in position on the carts, and highly efficient and durable in use, and the invention consists in the novel combinations and constructions hereinafter set forth and claimed.

In describing this invention, reference is had to the accompanying drawing in which like characters designate corresponding parts in all the views.

Figure 1:
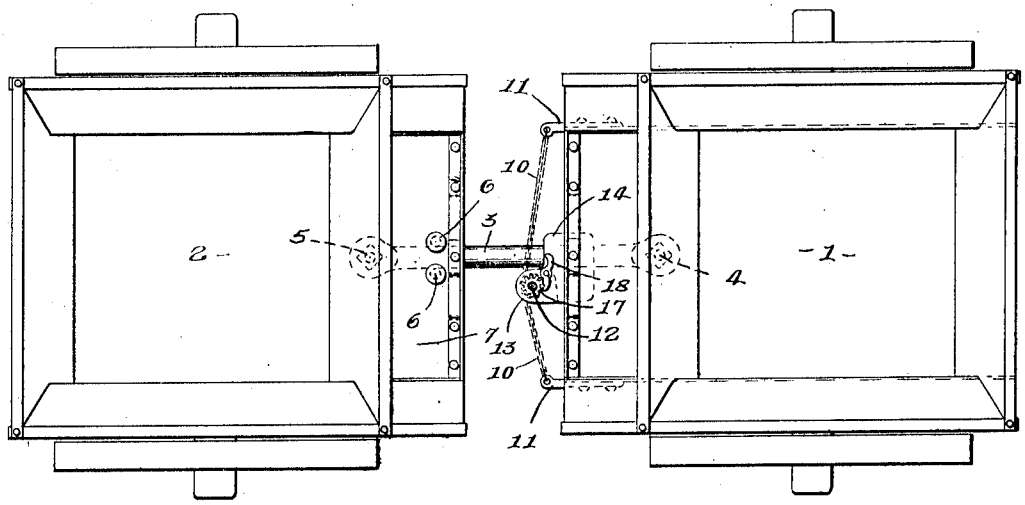
Figure 1 is a plan view of a pair of two-wheeled carts provided with our invention.
Figure 2:
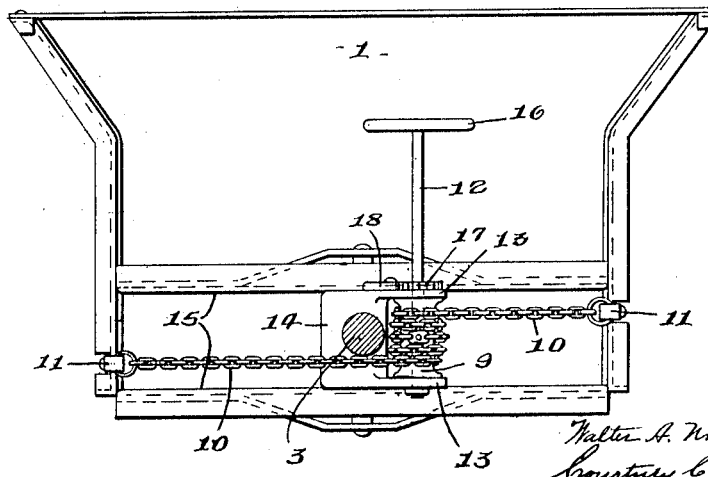
Fig. 2 is an end elevation of the cart at the right of Fig. 1, the tongue being shown in cross-section.

This invention comprises, generally, steering mechanism for a pair of two-wheeled carts having coupling means which is rigidly connected with one cart and pivotally connected to the other cart, the steering means being here shown as carried by the coupling means. The coupling means is preferably pivotally connected to both carts so that the carts can be drawn when desired, and one will trail behind the other when the carts are connected with any suitable means for causing the rear cart to trail in the tracks of the leading cart when turning a corner. The latter means has no bearing on the present invention and may be any suitable form, and one form is shown in our pending application Sr. No. 804,470, filed December 3, 1913. Means is provided by which the pivotal movement of the coupling means and one cart is rendered ineffective to facilitate the pivotal movement of the other cart relatively to the coupling means to effect the steering. Hence the tongue, so far as this invention is concerned, is rigid with one cart.

1 and 2 are respectively the carts of a pair coupled together, as here shown, by a tongue 3 which is pivoted at 4 and 5 thereto respectively, the tongue extending centrally of the carts along the normal line of draft. 6 designates pins extending through openings in the platform 7 of one cart as the cart 2 on opposite sides of the tongue 3 in order to hold the tongue from pivotal movement relatively to one of said carts so that the other cart 1 is free to move pivotally to effect the steering.

The carts may be steered by turning either the front or rear cart depending on whether the cart 1, which is pivoted to the coupling means, is the front or rear cart. The steering mechanism is preferably carried by the coupling means or tongue 3 and comprises a windlass 9 carried by the tongue 3, and means as power transmitting elements or cables 10 extending in opposite directions from the windlass and winding in opposite directions thereon, the cables 10 being connected to brackets 11 provided on the pivoted cart 1 and located on the sides of the cart.

The windlass 9 is mounted on a staff 12 journaled in brackets 13 projecting from a slide 14 mounted on the coupling 3 and slidable or movable along a guideway 15 located beneath the platform 8 of the cart and extending crosswise of the tongue, the staff 12 having a steering wheel 16 at its upper end. The part 14 is capable of sliding slightly on the draw bar 3 and also in the guide 15 in order to adjust itself to the angular relation of the draw bar 3 and the cart 1. The turning movement of the windlass is normally prevented by a toothed wheel 17 and a pawl 18, the toothed wheel being mounted on the staff 12 above the upper bracket 13 and having square teeth and the pawl also having a square tooth so that movement of the windlass is prevented in opposite directions. The pawl is movable into and out of operative position by the foot of the operator.

This steering means is particularly applicable for two-wheeled carts used in road making, as in building roads, it is desirable not to run the heavy traction or road engine on the partly completed bed; and in operation, the steering is accomplished by turning the rear cart 1 whether the cart 1 is in front or second from the front.

What we claim is:—

1. The combination with a pair of two-wheel carts, a tongue connecting the carts and pivotally connected to the body of one cart and rigidly connected to the body of the other cart, of mechanism for turning one of the carts comprising a steering member supported by the tongue and connections extending laterally in opposite directions from the steering member and connected to the body of the cart on opposite sides of the steering member, substantially as and for the purpose set forth.

2. The combination with a pair of two-wheeled carts having a tongue connecting the same and pivotally connected to one cart and rigidly connected to the other cart, of mechanism for turning the pivoted cart comprising a block slidably carried by the tongue, whereby the block can slide thereon during the turning of one cart, and steering means carried by the block, and connections extending laterally in opposite directions therefrom and connected to the pivoted cart, substantially as and for the purpose described.

3. The combination with a pair of two-wheeled carts having means coupling the same together, said means being rigidly connected to one cart and pivoted to the other, of mechanism for turning the pivoted cart, said mechanism comprising a body carried by the coupling means and slidable lengthwise thereof, a steering post mounted on the body, and power-transmitting elements connected to the post and to the pivoted cart on opposite sides of the post, substantially as and for the purpose specified.

4. The combination of a pair of two-wheeled carts having a tongue coupling the same together, the tongue being rigidly connected to one cart and pivotally connected to the other cart and the latter cart being formed with a guide at its end opposed to the former cart, the guide extending crosswise of the tongue, a slide mounted on the tongue and movable along the guide, and steering mechanism carried by the slide and connected to the pivoted cart, substantially as and for the purpose specified.

5. The combination of a pair of two-wheeled carts having a tongue coupling the same together, the tongue being rigidly connected to one cart and pivotally connected to the other cart and the latter cart being formed with a guide at its end opposed to the former cart, the guide extending crosswise of the tongue, a slide mounted on the tongue and movable along the guide, and steering mechanism including power transmitting elements connected to the slide and to the pivoted cart on opposite sides of the tongue, substantially as and for the purpose set forth.

In testimony whereof, we have hereunto signed our names in the presence of two attesting witnesses, at Auburn, in the county of Cayuga, in the State of New York, this 18th day of November, 1913.

WALTER A. UNDERHILL.
COURTNEY C. AVERY.

Witnesses:
MARIE M. KINCHLEY,
CHAS. H. YOUNG.

Copies of this patent may be obtained for five cents each, by addressing the "Commissioner of Patents, Washington, D. C."